(12) United States Patent
Maeno et al.

(10) Patent No.: US 11,429,703 B2
(45) Date of Patent: Aug. 30, 2022

(54) AUTHENTICATION DEVICE, AUTHENTICATION SYSTEM, AUTHENTICATION METHOD, AND PROGRAM

(71) Applicant: Panasonic Intellectual Property Management Co., Ltd., Osaka (JP)

(72) Inventors: Kazuki Maeno, Kanagawa (JP); Hiroaki Yoshio, Kanagawa (JP); Hajime Tamura, Tokyo (JP); Yasunobu Ogura, Kanagawa (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 320 days.

(21) Appl. No.: 16/747,251

(22) Filed: Jan. 20, 2020

(65) Prior Publication Data

US 2020/0159899 A1 May 21, 2020

Related U.S. Application Data

(63) Continuation of application No. PCT/JP2018/023565, filed on Jun. 21, 2018.

(30) Foreign Application Priority Data

Sep. 28, 2017 (JP) .............................. JP2017-188543

(51) Int. Cl.
*G06F 21/32* (2013.01)
*H04L 9/32* (2006.01)
*G06V 40/16* (2022.01)

(52) U.S. Cl.
CPC ............ *G06F 21/32* (2013.01); *G06V 40/172* (2022.01); *H04L 9/3231* (2013.01); *G06V 40/178* (2022.01)

(58) Field of Classification Search
CPC ......... G06F 21/32; H04L 9/3231; H04L 9/32; G06V 40/172; G06V 40/178; G06V 40/16
See application file for complete search history.

(56) References Cited

U.S. PATENT DOCUMENTS

| 7,522,773 B2 | 4/2009 | Gallagher et al. |
| 9,665,754 B2 * | 5/2017 | Hagen ................ G06K 7/10009 |

(Continued)

FOREIGN PATENT DOCUMENTS

| CN | 106203294 A | 12/2016 |
| JP | 2006-053852 | 2/2006 |

(Continued)

OTHER PUBLICATIONS

A Study of Face Recognition as People Age, Ling et al., Published in: 2007 IEEE 11th International Conference on Computer Vision. (Year: 2007).*

(Continued)

*Primary Examiner* — Jayesh M Jhaveri
(74) *Attorney, Agent, or Firm* — McDermott Will & Emery LLP (57) ABSTRACT

An authentication device includes an acquisition unit that acquires first image data generated at a first timing and indicating a first face of a living creature to be authenticated, age information indicating an age of the living creature at the first timing, second image data generated at a second timing later than the first timing and indicating a second face of the living creature, and aging information indicating a time period from the first timing to the second timing, and a controller that compares the first image data with the second image data. The controller calculates a similarity between the first face and the second face based on the first image data and the second image data, corrects the similarity based on the age information and the aging information, and determines, based on the corrected similarity, whether the (Continued)

living creature in the first image data is identical to the living creature in the second image data.

15 Claims, 8 Drawing Sheets

(56) References Cited

U.S. PATENT DOCUMENTS

| | | | |
|---|---|---|---|
| 10,049,261 B2* | 8/2018 | Tai | G06V 40/171 |
| 2006/0034542 A1* | 2/2006 | Aoyama | G06V 10/431 |
| | | | 382/115 |
| 2009/0175512 A1* | 7/2009 | Hyuga | G06V 40/172 |
| | | | 382/118 |
| 2014/0064577 A1 | 3/2014 | Kato et al. | |
| 2016/0269401 A1 | 9/2016 | Saito et al. | |
| 2017/0277938 A1* | 9/2017 | Uimonen | G06V 40/50 |
| 2018/0226079 A1* | 8/2018 | Khoury | G10L 17/26 |
| 2018/0276869 A1* | 9/2018 | Matts | G06F 30/20 |
| 2018/0293429 A1* | 10/2018 | Wechsler | G06K 9/6271 |

FOREIGN PATENT DOCUMENTS

| | | |
|---|---|---|
| JP | 2009-163555 | 7/2009 |
| JP | 2016-162182 A | 9/2016 |
| JP | 2016-170700 | 9/2016 |
| JP | 6040640 B | 12/2016 |

OTHER PUBLICATIONS

The Extended European Search Report dated Sep. 7, 2020 for the related European Patent Application No. 18863639.3.
Geng X et al: "Automatic Age Estimation Based on Facial Aging Patterns", IEEE Transactions on Pattern Analysis and Machine Intelligence, IEEE Computer Society, USA, vol. 29, No. 12, Dec. 1, 2007 (Dec. 1, 2007), pp. 2234-2240, XP007903816.
Lanitis A et al: "Toward Automatic Simulation of Aging Effects on Face Images", IEEE Transactions on Pattern Analysis and Machine Intelligence, IEEE Computer Society, USA, vol. 24, No. 4, Apr. 1, 2002 (Apr. 1, 2002), pp. 442-455, XP001144045.
International Search Report of PCT application No. PCT/JP2018/023565 dated Sep. 11, 2018.

* cited by examiner

|  | Number of passed years: 0 | Number of passed years: 1 | Number of passed years: 2 | ... |
|---|---|---|---|---|
| Age group of registered image: A | $t_{A,0}$ | $t_{A,1}$ | $t_{A,2}$ | |
| Age group of registered image: B | $t_{B,0}$ | $t_{B,1}$ | $t_{B,2}$ | |
| Age group of registered image: C | $t_{C,0}$ | $t_{C,1}$ | $t_{C,2}$ | |
| ... | | | | |

| | Number of passed years: 0 | Number of passed years: 1 | ... |
|---|---|---|---|
| Age group of comparison source image: A | $S_{A,0,1}, ..., S_{A,0,i}, ..., S_{A,0,N_{A,0}}$ | $S_{A,1,1}, ..., S_{A,1,i}, ..., S_{A,1,N_{A,1}}$ | |
| Age group of comparison source image: B | $S_{B,0,1}, ..., S_{B,0,i}, ..., S_{B,0,N_{B,0}}$ | $S_{B,1,1}, ..., S_{B,1,i}, ..., S_{B,1,N_{B,1}}$ | |
| Age group of comparison source image: C | $S_{C,0,1}, ..., S_{C,0,i}, ..., S_{C,0,N_{C,0}}$ | $S_{C,1,1}, ..., S_{C,1,i}, ..., S_{C,1,N_{C,1}}$ | |
| ... | | | |

| | Number of passed years: 0 | Number of passed years: 1 | ... |
|---|---|---|---|
| Age group of comparison source image: A | $m_{A,0}$, $\sigma_{A,0}$ | $m_{A,1}$, $\sigma_{A,1}$ | |
| Age group of comparison source image: B | $m_{B,0}$, $\sigma_{B,0}$ | $m_{B,1}$, $\sigma_{B,1}$ | |
| ... | | | |

AUTHENTICATION DEVICE, AUTHENTICATION SYSTEM, AUTHENTICATION METHOD, AND PROGRAM

TECHNICAL FIELD

The present disclosure relates to an authentication device, an authentication system, an authentication method, and a program that authenticate an object.

BACKGROUND ART

PTL 1 discloses an image processor that performs person recognition processing based on a facial feature amount. This image processor extracts an image that is recognized as an image of a target person among a plurality of images based on the facial feature amount. At this time, based on an actual age calculated from an imaging date and a date of birth, and an apparent age estimated from the extracted image, whether a recognition result is correct is determined. For example, when the age obtained through a correction of the actual age is different from the estimated apparent age by a predetermined value or more, the extracted image is determined to be an image of a different person. Accordingly, occurrence of a recognition error is reduced.

CITATION LIST

Patent Literature

PTL 1: Japanese Patent Publication No. 6040640

SUMMARY

The present disclosure provides an authentication device, an authentication system, an authentication method, and a program that accurately authenticate an object.

The authentication device of the present disclosure includes an acquisition unit that acquires first image data generated at a first timing and indicating a first face of a living creature to be authenticated, age information indicating an age of the living creature at the first timing, second image data generated at a second timing later than the first timing and indicating a second face of the living creature, and aging information indicating a time period from the first timing to the second timing, and a controller that compares the first image data with the second image data. The controller calculates a similarity between the first face and the second face based on the first image data and the second image data, corrects the similarity based on the age information and the aging information, and determines, based on the corrected similarity, whether the living creature in the first image data is identical to the living creature in the second image data.

These general and specified aspects may be achieved by a system, a method, and a computer program, and any combination of the system, the method, and the computer program.

According to the authentication device, the authentication system, the authentication method, and the program of the present disclosure, based on age information of an object (for example, person), the object can be accurately authenticated through a correction of the similarity of the object.

DESCRIPTION OF EMBODIMENTS (Knowledge Underlying the Present Disclosure)

The image processor of Patent Literature 1 determines whether the recognition result of the person is correct based on the apparent age estimated from the image. Therefore, in order to accurately distinguish the target person from a different person, the apparent age must be accurately estimated. However, even if the age is the same, the apparent age differs depending on the person, and thus correctly estimating the apparent age is difficult.

The present disclosure provides an authentication device and an authentication system that accurately authenticate an object whose appearance changes over time. Specifically, an authentication device and an authentication system are provided that accurately identify a target person even when a face of the person changes over time. For example, the authentication system of the present disclosure performs automatic face authentication using a face image of a person registered in a passport, a driver's license, a student's identification card, and the like to determine whether the person is the target person. At this time, even if the appearance of the face of the target person has changed from the image registered in the passport and the like, the target person can be accurately identified.

(Exemplary Embodiment)

In the present exemplary embodiment, an example where the authentication object is a person will be described. Specifically, in the present exemplary embodiment, as an example of authentication, an example where an automatic face authentication is performed using an image of an integrated circuit (IC) passport (so-called passport) during an immigration inspection at an airport will be described.

1. Configuration 1.1 Appearance

Figure 1:
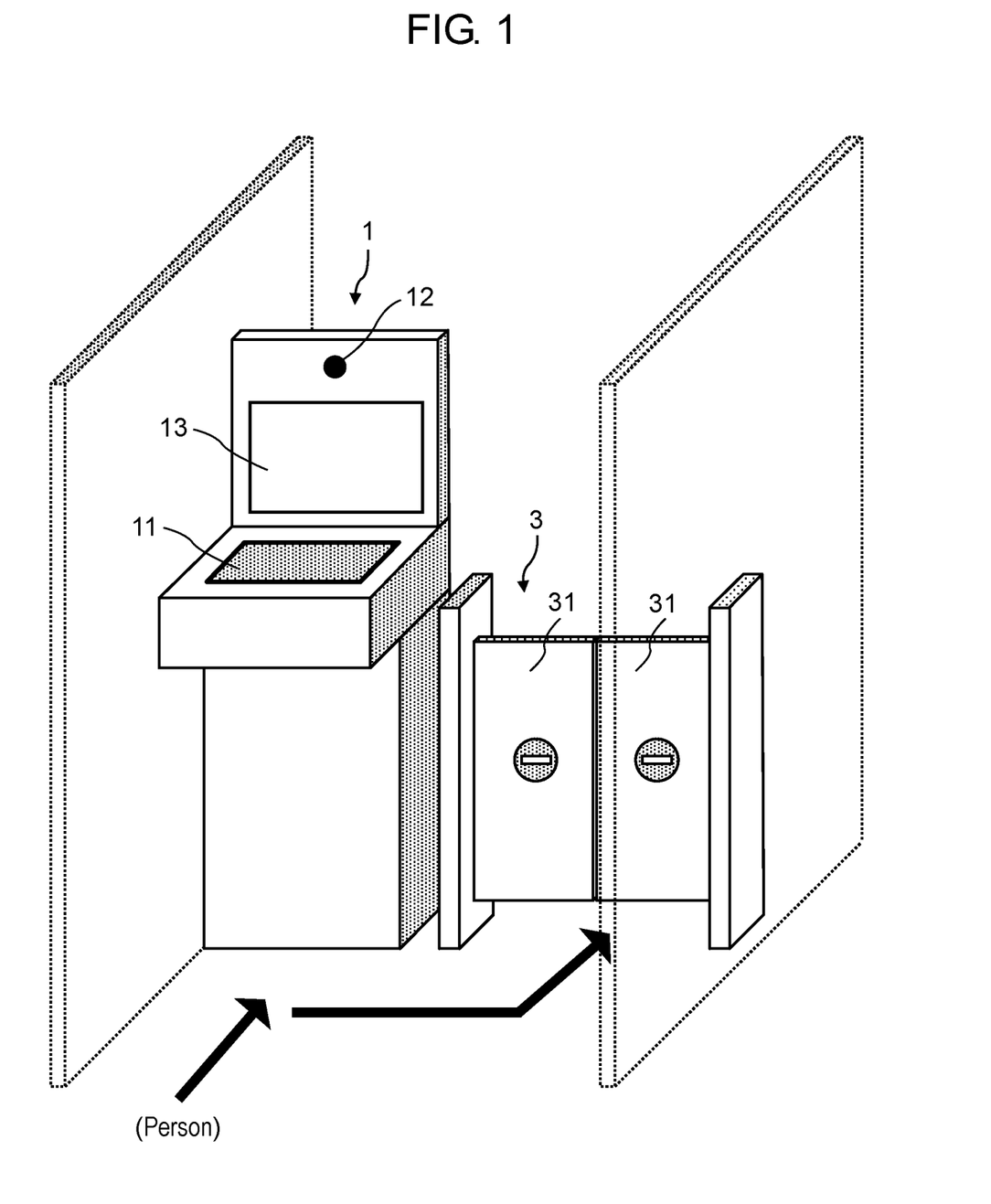
FIG. 1 is a view schematically showing a collation terminal and a gate drive device.

FIG. 1 schematically shows appearances of a collation terminal and a gate drive device. In the present exemplary embodiment, collation terminal 1 and gate drive device 3 are installed in an immigration inspection area of an airport.

Collation terminal 1 includes reader 11, image capturer 12, and display 13. A person who tries to leave or enter a country at the airport stands in front of collation terminal 1 and places a passport he or she possesses on top of reader 11. Collation terminal 1 acquires a face image registered in the passport by reader 11, and acquires a face image of the person standing in front of collation terminal 1 by image capturer 12. Collation terminal 1 displays a determination result as to whether the person of the face image registered in the passport and the person standing in front of collation terminal 1 are identical in display 13.

Gate drive device 3 includes gate 31 that opens and closes according to the determination result of the face authentication. Gate 31 is controlled so as to opens only when the person standing in front of collation terminal 1 is identical to the person of the face image registered in the passport.

1.2 Internal Configuration

Figure 2:
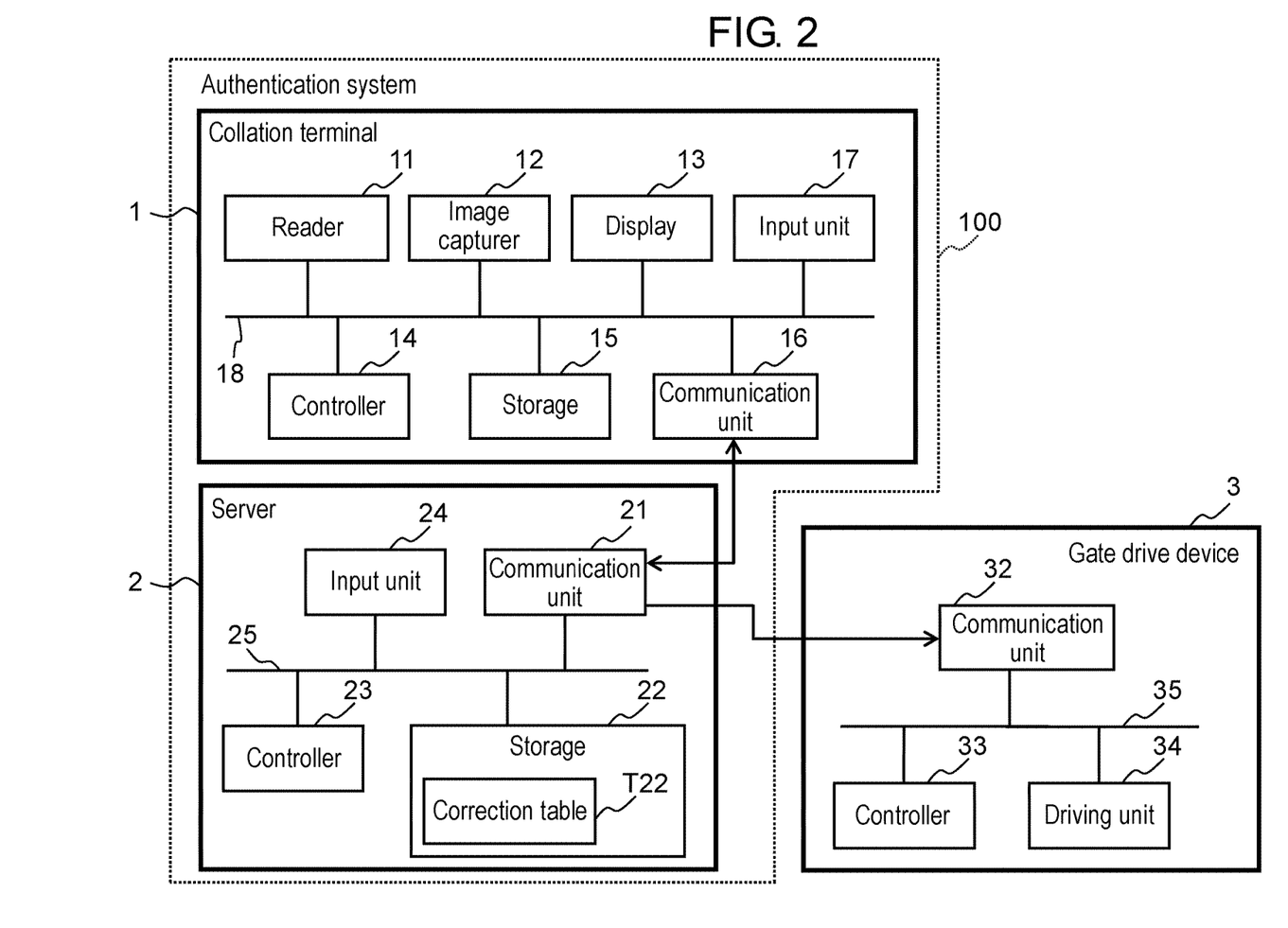
FIG. 2 is a diagram showing a configuration of an authentication system and the gate drive device.

FIG. 2 shows an electrical configuration of the authentication system and the gate drive device of the present disclosure. Authentication system 100 is configured with collation terminal 1 and server 2. In the present exemplary embodiment, server 2 is the authentication device that performs face authentication.

1-2-1. Collation Terminal

In addition to reader 11, image capturer 12, and display 13, collation terminal 1 further includes controller 14, storage 15, communication unit 16, input unit 17, and bus 18.

Reader 11 is an integrated circuit (IC) reader that reads information recorded in an integrated circuit (IC) chip of a passport. In the integrated circuit (IC) chip of the passport, information such as a face image, a name, a date of birth, an issuance date of the passport (or imaging date of the face), a nationality, a gender, and a passport number is recorded.

Image capturer 12 is a camera that includes an imaging element such as a charge-coupled device (CCD) image sensor, a complementary metal oxide semiconductor (CMOS) image sensor, or an N-channel metal oxide semiconductor (NMOS) image sensor. Image capturer 12 captures an image of a person standing in front of collation terminal 1 and generates image data. The image data generated by the image capturer 12 includes information that indicates the imaging date.

Display 13 is configured with, for example, a liquid crystal display or an organic electroluminescence (EL) display.

Controller 14 controls an operation of collation terminal 1. Controller 14 can be implemented by a semiconductor element or the like. Controller 14 can be configured with, for example, a microcomputer, a central processing unit (CPU), a microprocessor unit (MPU), a digital signal processor (DSP), a field programmable gate array (FPGA), or an application specific integrated circuit (ASIC). Functions of controller 14 may be only configured with hardware, or may be implemented through a combination of hardware and software. Controller 14 reads data or a program stored in storage 15 and executes various calculation processing for achievement of a predetermined function. The program executed by controller 14 may be provided by communication unit 16 or the like, or may be stored in a portable recording medium.

Storage 15 can be implemented by, for example, a hard disk (HDD), a solid state drive (SSD), a random access memory (RAM), a dynamic random access memory (DRAM), a ferroelectric memory, a flash memory, a magnetic disk, or any combination thereof.

Communication unit 16 includes a circuit that communicates with an external device in conformity with a predetermined communication standard (for example, local area network (LAN), Wi-Fi (registered trademark), Bluetooth (registered trademark), universal serial bus (USB), and HDMI (registered trademark)).

Input unit 17 is a user interface that receives a variety of operations by a user. For example, input unit 17 configures a touch panel together with display 13. Input unit 17 may include a keyboard, a button, a switch, or any combination thereof.

Bus 18 is a signal line that electrically connects reader 11, image capturer 12, display 13, controller 14, storage 15, communication unit 16, and input unit 17.

1-2-2. Server

Server 2 includes communication unit 21, storage 22, controller 23, input unit 24, and bus 25.

Communication unit 21 includes a circuit that communicates with an external device in conformity with a predetermined communication standard (for example, local area network (LAN), Wi-Fi (registered trademark), Bluetooth (registered trademark), universal serial bus (USB), and HDMI (registered trademark)). Communication unit 21 is an example of an acquisition unit that acquires first image data generated at a first timing and indicating a first face of an person to be authenticated, age information indicating an age of the person at the first timing, second image data generated at a second timing later than the first timing and indicating a second face of the person, and aging information indicating a time period from the first timing to the second timing.

Storage 22 can be implemented by, for example, a hard disk (HDD), a solid state drive (SSD), a random access memory (RAM), a dynamic random access memory (DRAM), a ferroelectric memory, a flash memory, a magnetic disk, or any combination thereof. Storage 22 stores correction table T22 that is used at a time of face authentication.

Controller 23 controls an operation of server 2. Controller 23 can be implemented by a semiconductor element or the like. Controller 23 can be configured with, for example, a microcomputer, a central processing unit (CPU), a microprocessor unit (MPU), a digital signal processor (DSP), a field programmable gate array (FPGA), or an application specific integrated circuit (ASIC). Functions of controller 14 may be only configured with hardware, or may be implemented through a combination of hardware and software. Controller 23 reads data or a program stored in storage 22 and executes various calculation processing for achievement of a predetermined function. The program executed by controller 23 may be provided by communication unit 21, or may be stored in a portable recording medium.

Input unit 24 is a user interface that receives a variety of operations by a user. For example, input unit 24 may include a keyboard, a button, a switch or any combination thereof.

Bus 25 is a signal line that electrically connects communication unit 21, storage 22, controller 23, and input unit 24.

1-2-3. Gate Drive Device

Gate drive device 3 controls opening and closing of gate 31 shown in FIG. 1. Gate drive device 3 includes communication unit 32, controller 33, driving unit 34 and bus 35.

Communication unit 32 includes a circuit that communicates with an external device in conformity with a predetermined communication standard (for example, local area network (LAN), Wi-Fi (registered trademark), Bluetooth (registered trademark), universal serial bus (USB), and HDMI (registered trademark)).

Controller 33 controls an operation of gate drive device 3. Controller 33 can be implemented by a semiconductor element or the like. Controller 33 can be configured with, for example, a microcomputer, a central processing unit (CPU), a microprocessor unit (MPU), a digital signal processor (DSP), a field programmable gate array (FPGA), or an application specific integrated circuit (ASIC). Functions of controller 33 may be only configured with hardware, or may be implemented through a combination of hardware and software.

Driving unit 34 is a device that opens and closes gate 31. Bus 35 is a signal line that electrically connects communication unit 32, controller 33, and driving unit 34.

2. Operation of Authentication System

2.1 Face Authentication Processing

Figure 3:
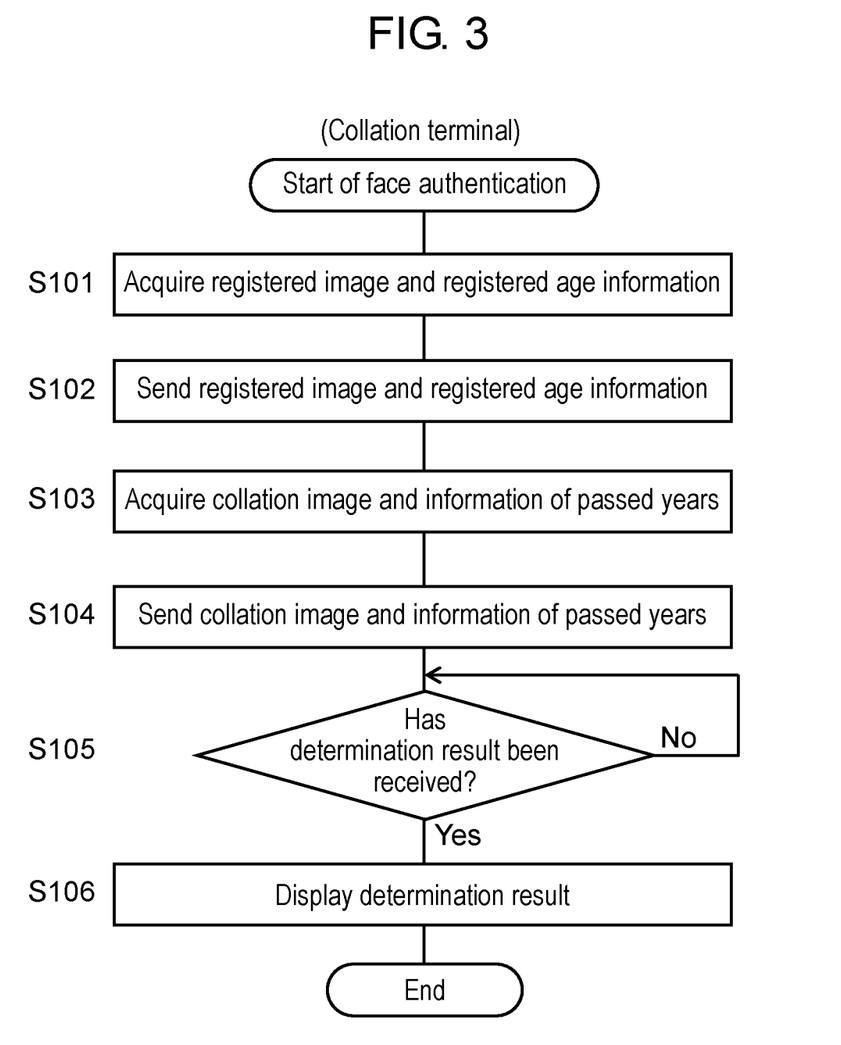
FIG. 3 is a flowchart for describing an operation of the collation terminal during face authentication processing.

Face authentication processing by authentication system 100 will be described with reference to FIGS. 3 to 5. FIG. 3 shows an operation of controller 14 of collation terminal 1 during face authentication processing. Controller 14 of collation terminal 1 reads information such as a face image, a date of birth, and an issuance date of a passport (or imaging date of the face image) from an integrated circuit (IC) chip of the passport through reader 11. By doing so, controller 14 acquires data of a registered image and registered age information that is information indicating registered age (S101). The "registered image" is a face image recorded in the integrated circuit (IC) chip of the passport that is read by the reader 11. The "registered age" is the actual age of the person when the registered image has been generated. In the present exemplary embodiment, the "registered age" is the actual age when the passport has been issued. The registered age information to be acquired is the date of birth and the issuance date recorded in the integrated circuit (IC) chip (or imaging date of the registered image). Controller 14 sends the data of the registered image and the registered age information to server 2 via communication unit 16 (S102). At this time, controller 14 may send the date of birth and the issuance date (or imaging date of the registered image) as the registered age information, or may send the actual age calculated from the date of birth and the issuance date (or imaging date of the registered image).

Controller 14 captures an image of the face of the person in front of collation terminal 1 by image capturer 12. By doing so, controller 14 acquires data of a collation image, and aging information that is information indicating a number of passed years between the issuance date of the passport (or imaging date of the registered image) and an imaging date of the collation image (S103). The "collation image" is a face image of the person that has been captured by image capturer 12. The "number of passed years" is the number of passed years since the registered image has been generated until the collation image has been generated. Aging information to be acquired is, for example, an imaging date. Controller 14 sends the data of the collation image and the aging information to server 2 via communication unit 16 (S104). At this time, controller 14 may send the imaging date of the collation image as the aging information, may send the number of passed years calculated from the imaging date of the collation image and the issuance date of the passport (or imaging date of the registered image), or may send the actual age when the collation image of the person has been captured.

An order of a step for acquiring the registered image and the registered age information (S101), and a step for acquiring the collation image and the aging information (S103) is not limited to the order shown in FIG. 3. Acquisition of the registered image and the registered age information (S101) and acquisition of the collation image and the aging information (S103) may be concurrently performed. The acquisition of the collation image and the aging information (S103) may be performed before the acquisition of the registered image and the registered age information (S101). Similarly, the order of a step for sending the data of the registered image and the registered age information (S102), and a step for sending the data of the collation image and the aging information (S104) is not limited to the order shown in FIG. 3. Sending of the data of the registered image and the registered age information (S102) and sending of data of the collation image and the aging information (S104) may be concurrently performed. Sending of the data of the collation image and the aging information (S104) may be performed before sending of the data of the registered image and the registered age information (S102).

Server 2 determines whether the persons of the registered image and the collation image are identical. Controller 14 determines whether a determination result has been received from server 2, the determination result showing whether the persons of the registered image and the collation image are identical (S105). Controller 14 waits until the determination result is received (No in S105). After receiving the determination result (Yes in S105), controller 14 displays the determination result in display 13 (S106).

Figure 4:
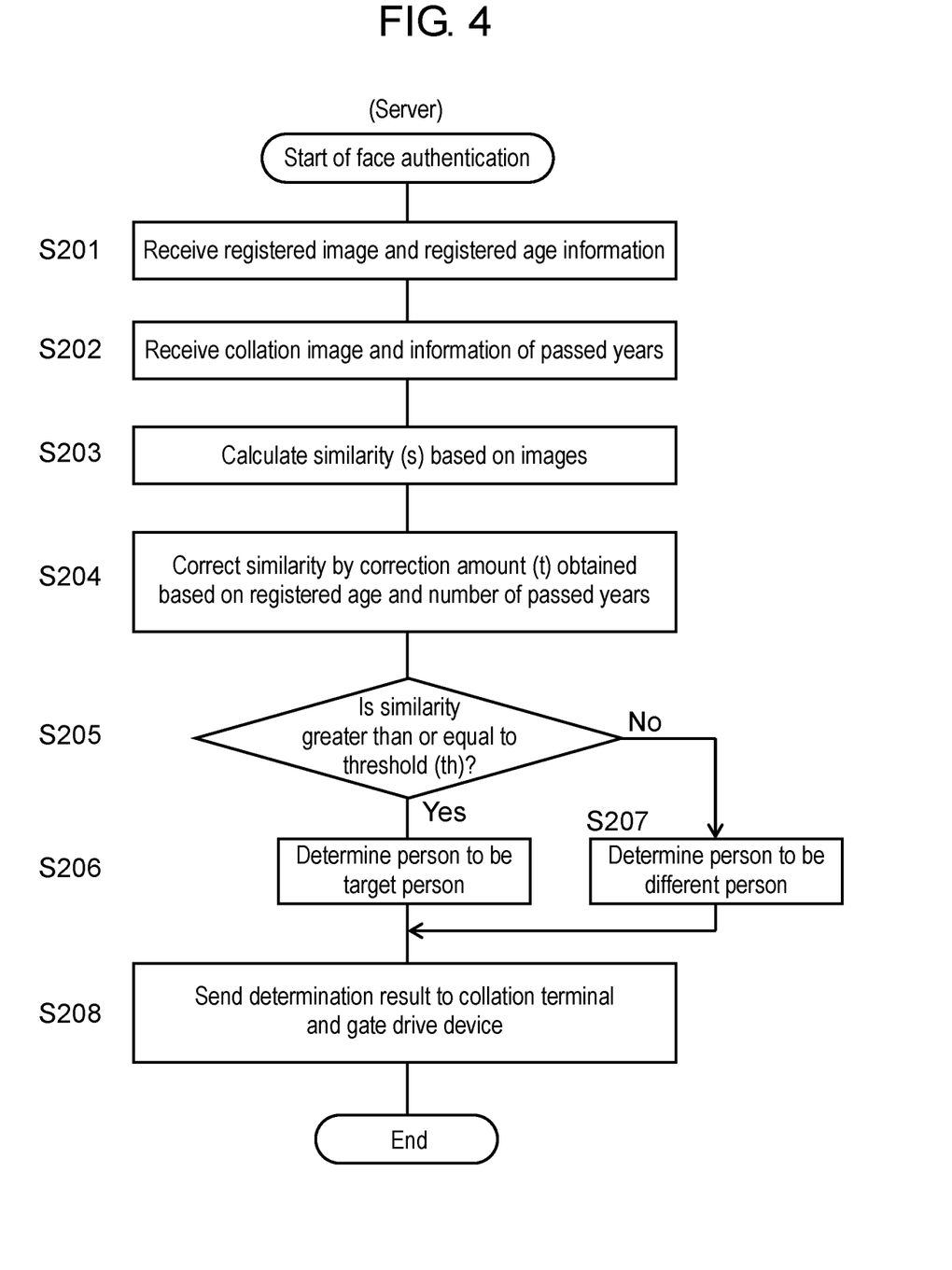
FIG. 4 is a flowchart for describing an operation of a server during face authentication processing.

FIG. 4 shows an operation of controller 23 of server 2 during face authentication processing. Controller 23 of server 2 receives the data of the registered image and the registered age information from the collation terminal 1 via communication unit 21 (S201). Further, controller 23 receives the data of the collation image and the aging information via communication unit 21 (S202). The order of receiving of the data of the registered image and the registered age information (S201), and receiving of the data of the collation image and the aging information (S202) is not limited to the order shown in FIG. 4. Receiving of the data of the registered image and the registered age information (S201) and receiving of data of the collation image and the aging information (S202) may be concurrently performed. Receiving of the data of the collation image and the aging information (S202) may be performed before receiving of the data of the registered image and the registered age information (S201).

Controller 23 calculates similarity s of the persons based on the registered image and the collation image (S203). Similarity s is a numerical value that indicates a degree of similarity to the person. How to calculate the similarity is arbitrary. For example, controller 23 extracts facial features from the registered image and the collation image, and calculates the similarity based on the extracted features. The facial features are, for example, a shape of a nose or an eye, and an interval between eyes.

Controller 23 refers to correction table T22 and corrects similarity s by correction amount t obtained based on the registered age and the number of passed years (S204). Specifically, in the present exemplary embodiment, controller 23 adds correction amount t to similarity s. FIG. 5 shows an example of correction table T22. Each of correction amounts t is set according to an age group of the person appearing in the registered image and the number of passed years obtained from the registered image. Subscripts of correction amount t of correction table T22 indicate, in order, the age group of the person appearing in the registered image (face image of passport), and the number of passed years since the registered image has been captured. For example, "$t_{A,0}$" indicates a correction amount for the age group "A" and the number of passed years "0". The age group is, for example, in one's teens, twenties, thirties, and so on. Note that the age group does not have to be every ten years. Further, each age group does not have to be set at equal intervals. For example, age groups may be set so that as the age decreases, the age range decreases as follows: age group A: 6 years old to 8 years old; age group B: 8 years old to 10 years old; age group C: 10 years old to 15 years old; age group D: 15 years old to 20 years old; and age group E: 20 years old to 30 years old. How to generate correction table T22 will be described later.

Controller 23 determines whether the corrected similarity is greater than or equal to predetermined threshold th (S205). How to set threshold th will be described later. If the corrected similarity is greater than or equal to threshold th (Yes in S205), controller 23 determines that the persons of the registered image and the collation image are identical, that is, the target person (S206), and sends the determination result to collation terminal 1 and gate drive device 3 (S208). If the corrected similarity is less than threshold th (No in S205), controller 23 determines that the person of the registered image is different from the person of the collation image, that is, a different person (S207), and sends the determination result to collation terminal 1 and gate drive device 3 (S208).

Through the correction of the similarity in step S204, even if similarity s before the correction is lower than threshold th, the corrected similarity may exceed threshold th. Therefore, a probability with which the person in the registered image is identified as the person in the collation image increases. As a result, for example, even in a case where the face has changed over time, the person can be identified as the target person.

After receiving the determination result from server 2 via communication unit 32, controller 33 of gate drive device 3 controls driving unit 34 to open gate 31 only when the determination result indicates that the person is the target person. As described above, through performing of the face authentication processing by authentication system 100, immigration processing can be automatically performed at the airport. Note that in addition to collation terminal 1 and gate drive device 3, server 2 may send the determination result to another device. For example, the determination result may be sent to a mobile terminal possessed by an inspector in the immigration inspection area.

2.2 Generation of Correction Table

Figure 6:
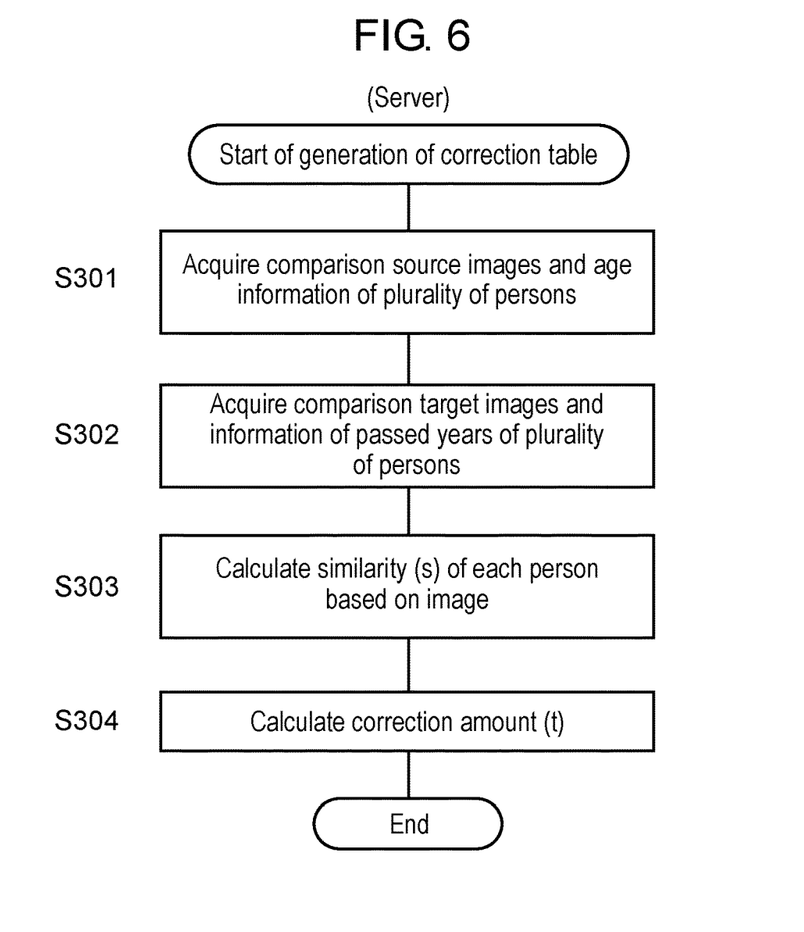
FIG. 6 is a flowchart showing generation of the correction table.
Figure 7:
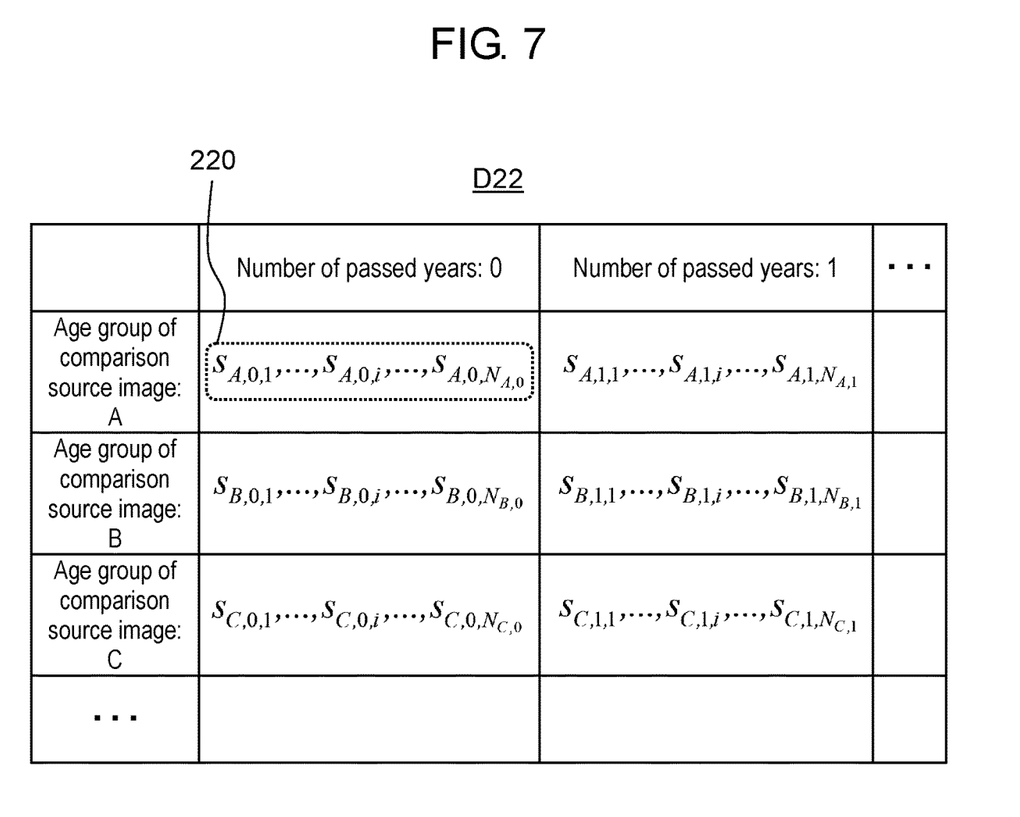
FIG. 7 is a table showing an example of a similarity distribution table.

With reference to FIGS. 6 and 7, how to generate correction table T22 will be described. FIG. 6 is a flowchart showing processing of generating correction table T22 in server 2.

Controller 23 of server 2 acquires data of face images of a plurality of persons not to be authenticated, which becomes a comparison source, and age information when these images have been generated (S301). Controller 23 may acquire the comparison source image data and the age information, for example, via communication unit 21, from passport information read by reader 11 of collation terminal 1, or may acquire the comparison source image data and the age information from a different external device or a recording medium.

Controller 23 acquires data of face images of the plurality of persons who are identical to the persons in step S301, which becomes a comparison target, and aging information that is information indicating the number of passed years since the comparison source images have been generated until the comparison target images have been generated (S302). The comparison target image in step S302 is an image that has been generated after the comparison source image in step S301 has been generated. Controller 23 may acquire the comparison target image data and the aging information, for example, via communication unit 21, from image data generated by image capturer 12 of collation terminal 1, or may acquire the comparison target image data and the aging information from a different external device or a recording medium. The aging information may be a date when the comparison target image has been generated, or may be the age of the person when the comparison target image has been generated.

Controller 23 calculates similarity s of each person between the comparison source image obtained in step S301, and the comparison target image obtained in step S302 (S303). How to calculate similarity s is arbitrary. For example, controller 23 calculates similarity s based on facial features extracted from the images.

Controller 23 calculates correction amount t based on similarity s (S304). Specifically, first, controller 23 generates a distribution table of calculated similarities s based on the age and the number of passed years obtained in steps S301 and S302. FIG. 7 shows an example of distribution table D22 of similarities. In distribution table D22, similarities s of the plurality of persons are classified into a plurality of groups 220 based on the age group of the person appearing in the comparison source image and the age difference (number of passed years) of the person when the comparison source image and the comparison target image each have been generated. In FIG. 7, subscripts of similarity s indicate the age group, the number of passed years, and the image number in order. For example, similarity $s_{A,0,1}$ indicates a similarity for the age group "A", the number of passed years "0", and the image number "1".

Controller 23 calculates mean value m of similarities s of each group 220 as shown in equation (1). Equation (1) indicates, as an example, an expression of calculating mean value $m_{A,0}$ for group 220 when the age group is "A" and the number of passed years is "0".

[Equation 1]

$$m_{A,0} = \frac{1}{N_{A,0}} \sum_{i=1}^{i=N_{A,0}} s_{A,0,i} \qquad (1)$$

Next, for each group 220, controller 23 calculates correction amount t which is a value obtained by subtracting mean value m from threshold th as shown in equation (2). When calculated correction amount t is smaller than 0, t=0 is set. Equation (2) indicates, as an example, an expression of calculating correction amount $t_{A,0}$ for group 220 when the age group is "A" and the number of passed years is "0".

[Equation 2]

$$t_{A,0} = th - m_{A,0} \qquad (2)$$

Figure 5:
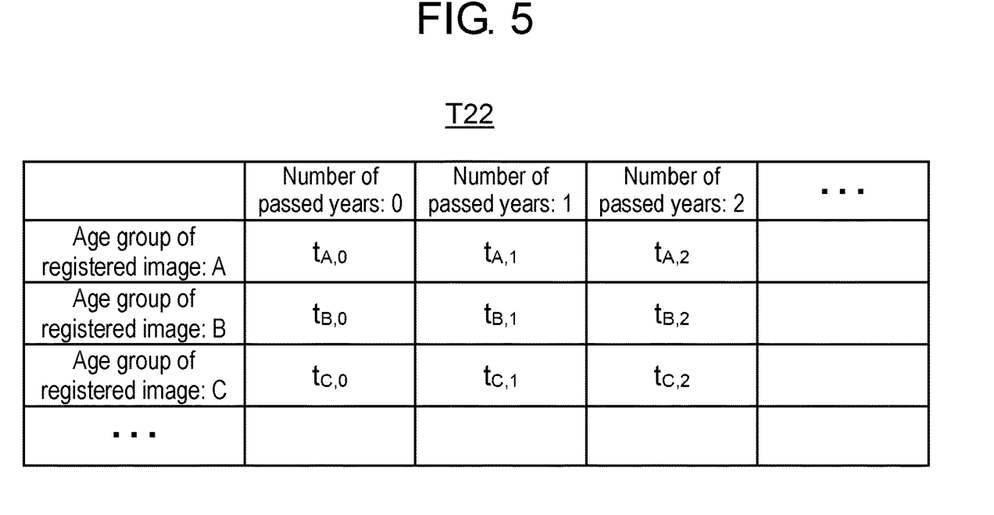
FIG. 5 is a table showing an example of a correction table.

As described above, controller 23 generates correction table T22 as shown in FIG. 5 by calculating correction amount t according to the age group of the comparison source image and the number of passed years.

Note that controller 23 may calculate correction amount t in another method. For example, controller 23 changes an order of similarities s into a descending order from the highest value in each group 220 of distribution table D22. For example, the order of similarities ($s_{A,0,1}$, $s_{A,0,2}$ · · · , $s_{A,0,N}$) of group 220 for the age group A and the number of passed years 0 is changed into a descending order from the highest value. Controller 23 may calculate correction amount $t_{A,0}$ according to equation (3) so that M % of data number N in group 220 exceeds threshold th and the target person is identified. Equation (3) indicates, as an example, an expression of calculating correction amount $t_{A,0}$ of group 220 for the age group "A" and the number of passed years "0". For example, M % =98%. Further, Rank=ROUNDUP (N×M×0.01).

[Equation 3]

$$t_{A,0} = th - s_{A,0,Rank} \qquad (3)$$

As the age decreases, a change in a face tends to increase over time. Therefore, as the age of the person of the registered image (comparison source image) decreases, similarity s decreases, and thus correction amount t increases.

Moreover, as the age difference between the registered image (comparison source image) and the collation image (comparison target image) increases, the change in the face tends to increase. Therefore, as the age difference increases, similarity s decreases, and thus correction amount t increases. Correction amount t determined as described above is added to similarity s in step S204 of FIG. 4. Accordingly, the corrected similarity is brought close to threshold th, and exceeds threshold th more often. As a result, even if the person has been young when the passport has been issued, and the age difference is large between when the passport has been issued and when the passport is used, the probability with which the person in the registered image is identified as the person in the collation image at a time of face authentication increases. Therefore, for example, regardless of the age group and the number of passed years, the probability with which the person in the registered image is identified as the the person in the collation image at the time of face authentication is the same.

2.3 Setting of Threshold

Figure 8:
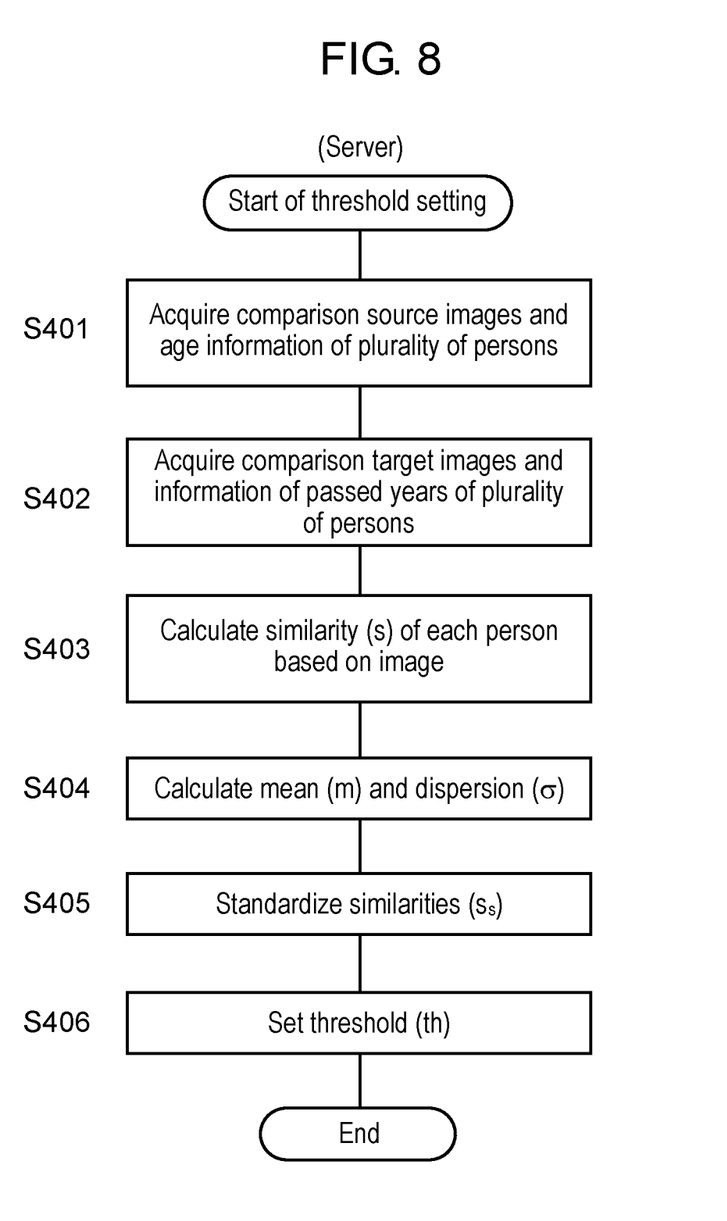
FIG. 8 is a flowchart for describing threshold setting processing.
Figure 9:
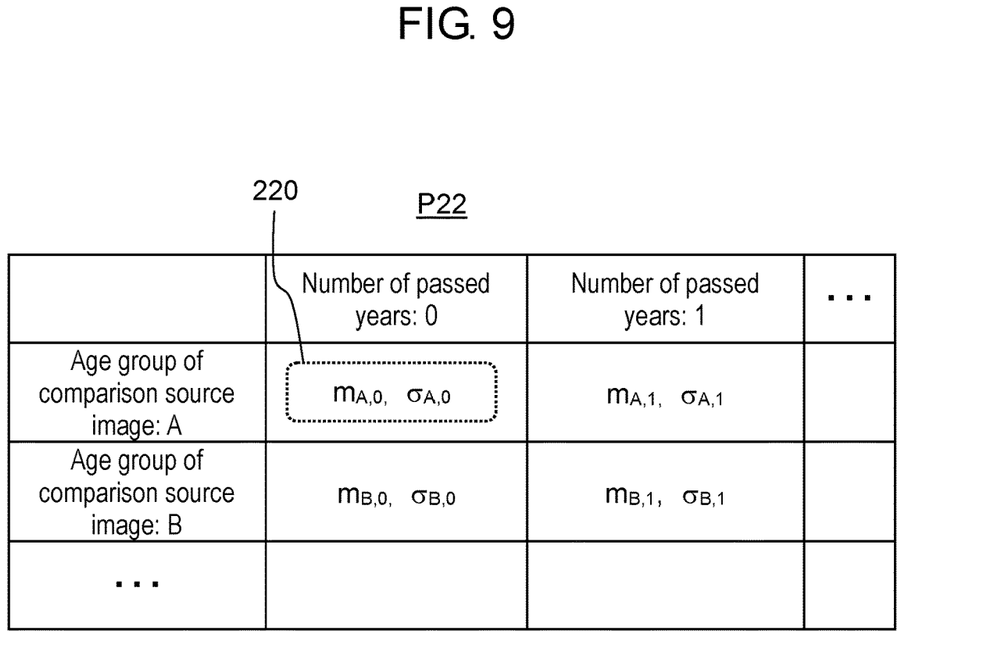
FIG. 9 is a table showing an example of statistical information of an average and a dispersion of similarities.
Figure 10:
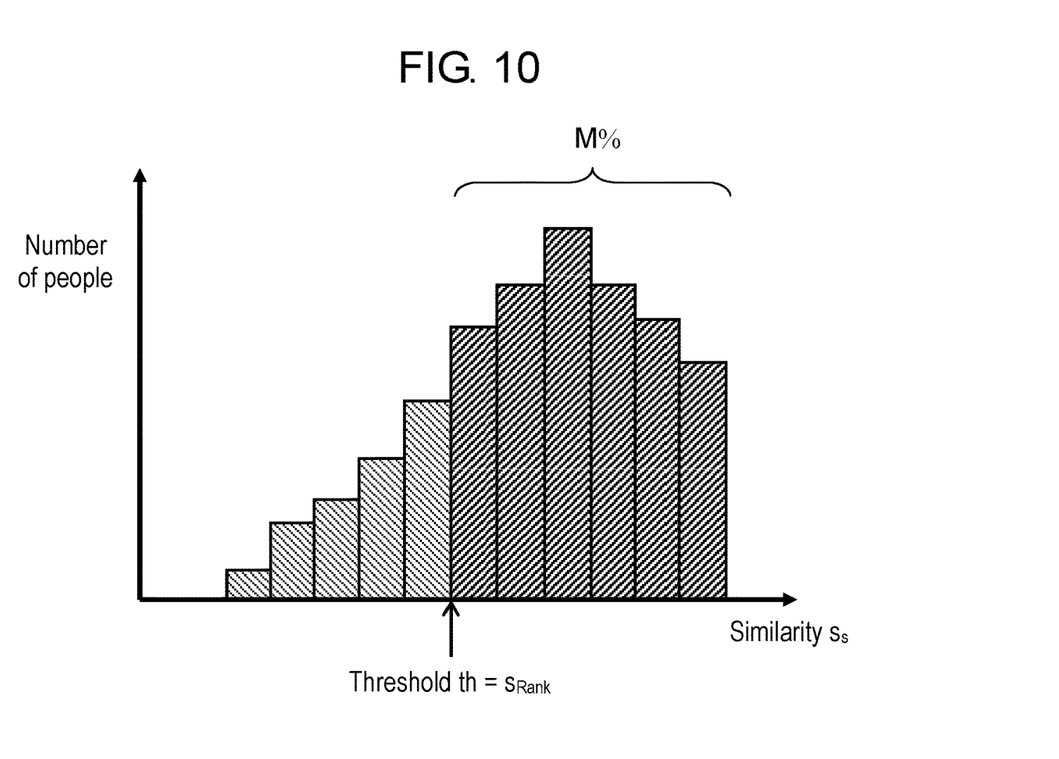
FIG. 10 is a graph showing a histogram of similarities after standardization for describing threshold setting.

With reference to FIGS. 8 to 10, how to set the threshold will be described. FIG. 8 is a flowchart showing processing of setting threshold by controller 23 of server 2.

Steps S401 to S403 of FIG. 8 are the same as steps S301 to S303 of FIG. 6. For each of the plurality of persons, controller 23 of server 2 acquires the age information indicating the age when the comparison source image has been generated, and the aging information indicating the number of passed years since the comparison source images has been generated until the comparison target images has been generated (steps S401 to S402). Then, controller 23 calculates the similarity between the comparison source image and the comparison target image (step S403). Then, controller 23 generates distribution table D22 of similarities s as shown in FIG. 7 based on the age when the comparison source image has been generated and the number of passed years. At this time, controller 23 sets, for example, a median of the age group as x and each age group as "x±τ". For example, when τ=2, age group A with median x=10 is 8 years old to 12 years old.

Controller 23 calculates mean m and dispersion σ of similarities s of each group 220 (S404) so as to generate statistical information P22 as shown in FIG. 9. In FIG. 9, subscripts of mean m and dispersion σ indicate the age group and the number of passed years in order.

Controller 23 defines a function that calculates mean m and dispersion σ. For example, function h for calculating mean m is defined as equation (4), and function l for calculating dispersion σ is defined as equation (5). In equations (4) and (5), $age_g$ indicates the age when the comparison source image has been generated (for example, registered age), and $age_p$ indicates the age when the comparison target image has been generated (for example, present age). Further, controller 23 calculates parameters α, β, γ of equations (4) and (5) for each group 220 by a least-squares method and the like using mean m and dispersion σ shown in statistical information P22 of FIG. 9. Here, $(age_p - age_g)$ is the number of passed years.

[Equation 4]

$$M = h(age_g, age_p) = \alpha_h \cdot age_g + \beta_h \cdot (age_p - age_g) + \gamma_h \quad (4)$$

[Equation 5]

$$\sigma = l(age_g, age_p) = \alpha_l \cdot age_g + \beta_l \cdot (age_p - age_g) + \gamma_l \quad (5)$$

Controller 23 standardizes similarities s calculated in step S403 by equation (6) using functions h, l shown in equations (4) and (5) (S405), and acquires similarity $S_s$ that has been standardized. Through the standardization of similarity s, a change in trend of the similarity due to the age group and over time is suppressed.

[Equation 6]

$$s_s = \frac{s - h(age_g, age_p)}{l(age_g, age_p)} \quad (6)$$

Controller 23 arranges similarities $S_s$ of all groups 220 that have been standardized in the descending order from the highest value. Then, controller 23 sets threshold th according to equation (7) so that M % of N persons exceeds threshold th and is identified as the target person. For example, M %=98%. Further, Rank=ROUNDUP (N×M× 0.01).

[Equation 7]

$$th = s_{Rank} \quad (7)$$

In FIG. 10, a horizontal axis indicates standardized similarity $s_s$, and a vertical axis indicates a histogram indicating the number of people. Percentage M with which the person in the registered image is identified as the person in the collation image is preset. When percentage M is set to be low, ranking Rank increases, and thus threshold th increases. In this case, when the person of the registered image is actually different from the person of the collation image, an accuracy rate increases. However, the persons of the registered image and the collation image are actually identical, the accuracy rate decreases. On the other hand, when percentage M is set to be high, ranking Rank decreases, and thus threshold th decreases. In this case, when the person of the registered image is actually different from the person of the collation image, the accuracy rate decreases. However, when the persons of the registered image and the collation image are actually identical, the accuracy ratio increases. In consideration of above points, percentage M is preset.

3. Effects and Supplements

In the present exemplary embodiment, the authentication device is server 2. Server 2 includes communication unit 21 (an example of an acquisition unit) that acquires a registered image (an example of first image data) generated at a first timing and indicating a first face of a person to be authenticated, age information (for example, a date of birth and an issuance date) indicating an age of the person (registered age) at the first timing, a collation image (an example of second image data) generated at a second timing later than the first timing and indicating a second face of the person, and aging information (for example, an imaging date or an age when the image has been captured) indicating a time period from the first timing to the second timing, and controller 23 that compares the registered image with the collation image. Controller 23 calculates a similarity between the first face and the second face based on the registered image and the collation image, corrects the similarity based on the registered age and the number of passed years, and determines, based on the corrected similarity, whether the person in the registered image is identical to the person in the collation image. As described above, in the present exemplary embodiment, the similarity is corrected based on the registered age and the time period. Therefore, even in a case where the face of the person changes over time, the identification can be accurately performed.

Specifically, server 2 determines a correction amount that is used when correcting the similarity based on the registered age and the number of passed years. As the registered age decreases, a change in face of a person increases over time. In addition, as the age difference between the registered age and the present age increases, the change in face of the person increases. Therefore, for example, when the person is young and the age difference is large, the value of the correction amount is increased. As a result, in a case where the age is low when the passport is made and the number of passed years is large, a decrease in the probability with which the person in the registered image is identified as the person in the collation image can be suppressed.

In the present exemplary embodiment, gate 31 automatically opens or closes based on the face authentication result after an acquisition of a registered image and a registered age from an IC passport. Therefore, for example, the gate at an immigration inspection of an airport can be automated. As a result, identity verification at the immigration inspection can be accelerated.

(Other Exemplary Embodiments)

The exemplary embodiments have been described above to exemplify the techniques disclosed in the present application. However, the techniques according to the present disclosure are not limited by the exemplary embodiments, and are applicable to other exemplary embodiments achieved through change, replacement, addition, elimination, or the like where appropriate. Accordingly, other exemplary embodiments are described below as examples.

In the present exemplary embodiment, the authentication device is server 2, and server 2 performs face authentication shown in FIG. 4. However, the authentication device may be collation terminal 1, and collation terminal 1 may perform face authentication shown in FIG. 4. In this case, reader 11 corresponds to the acquisition unit that acquires first image data generated at a first timing and indicating a first face of a person to be authenticated and age information indicating the age of the person at the first timing. Image capturer 12 corresponds to the acquisition unit that acquires second image data generated at a second timing later than the first timing and indicating the second face of the person, and aging information indicating a time period from the first timing to the second timing.

In the above exemplary embodiments, as a correction of similarity s, an example in which correction amount t selected from correction table T22 is added to similarity s has been described. However, how to correct similarity s is not limited to the above exemplary embodiments. For example, the corrected similarity may be calculated by function $f(s, age_g, age_p)$. In this case, $age_g$ indicates a registered age, and $age_p$ indicates a present age.

In the above exemplary embodiments, all similarities s are corrected in step S204. Alternatively, in a case where similarity s before the correction already exceeds threshold th, the persons of the registered image and the collation image can be determined to be identical, and thus similarity s does not have to be corrected. Alternatively, when similarity s before the correction is lower than threshold th by a predetermined value or more, the person of the registered image is highly possibly different from the person of the collation image, and thus similarity s does not have to be corrected.

In the above exemplary embodiments, face authentication is performed using an image recorded in a passport and a captured image. However, the image used for authentication is not limited to an image recorded in a passport and a captured image. For example, an image recorded in an integrated circuit (IC) card other than a passport may be used. According to the face authentication of the present disclosure, identification inspection can be performed using an integrated circuit (IC) card, in which information such as a face image, a name, a date of birth, an issuance date, (imaging date of a face), a nationality, and a card number is recorded in an integrated circuit (IC) chip, such as an Individual Number Card, a driver's license, a student's identification card, and a resident's card. The present disclosure is applicable to authentication using images that have been generated on different dates. Alternatively, the registered image and the collation image do not have to be acquired from the same collation terminal 1. The registered image and the collation image each may be acquired from a different device or recording medium.

In the above exemplary embodiments, an example in which face authentication is performed through comparison between one registered image and one collation image. Alternatively, the present disclosure is applicable to a case where a person's face is identified in a way not limited to face authentication. Therefore, for example, a person's face may be identified using the identification method in the present disclosure through comparison between a plurality of registered images and a plurality of collation images, comparison between a plurality of registered images and one collation image, and comparison between one registered image and a plurality of collation images.

In the above exemplary embodiments, an example in which a person's face is authenticated has been described. However, the authentication object is not limited to a person's face. For example, the authentication object may be a body part other than a face. Alternatively, the authentication object does not have to be a human being. For example, the authentication object may be an animal such as a monkey and a dog whose face changes over time. Particularly, mammals are suitable for the authentication object. The authentication object may be a living creature other than a human being, and may be a lifeless thing that changes over time. For example, the authentication object may be a structural object that deteriorates over time. In a case where the authentication object is a lifeless thing, instead of age information, for example, aging information such as the number of days or the number of years since the lifeless thing has been manufactured until a registered image and a collation image have been generated may be used.

In the above exemplary embodiments, as the time period, the number of passed years between the issuance date of the passport (or imaging date of the registered image) and the imaging date of the collation image is used. However, the time period is not limited to the number of passed years, and may be a numerical value obtained based on a difference between a date when the registered image has been generated and a date when the collation image has been generated. For example, instead of the number of passed years, the number of days, the number of weeks, or the number of months may be used.

In the above exemplary embodiments, controller 23 corrects the similarity based on the registered age and the time period. Controller 23 may correct the similarity based on other information in addition to the registered age and the time period. For example, the controller 23 can acquire information such as a nationality and a gender from a passport of the authentication object. Therefore, controller 23 may correct the similarity based on the acquired information such as the nationality and the gender.

(Summary of Exemplary Embodiments)

(1) The authentication device of the present disclosure includes an acquisition unit that acquires first image data generated at a first timing and indicating a first face of a living creature to be authenticated, age information indicating an age of the living creature at the first timing, second image data generated at a second timing later than the first timing and indicating a second face of the living creature, and aging information indicating a time period from the first timing to the second timing, and a controller that compares the first image data with the second image data. The controller calculates a similarity between the first face and the second face based on the first image data and the second image data, corrects the similarity based on the age information and the aging information, and determines, based on the corrected similarity, whether the living creature in the first image data is identical to the living creature in the second image data.

As described above, the similarity is corrected based on the age information and the aging information. Therefore, even in a case where the face of the living creature changes over time, the identification can be accurately performed.

(2) In the authentication device according to (1), the controller may determine a correction amount that is used when correcting the similarity based on the age information and the aging information.

As a result, when the age is low and the time period is large, a decrease in the probability with which the living creature is identified can be suppressed.

(3) In the authentication device according to (2), the correction amount may be selected from correction information that including a plurality of correction amounts, based on the age information and the aging information.

As a result, when the age is low and the time period is large, a decrease in the probability with which the living creature is identified can be suppressed.

(4) In the authentication device according to (3), the controller may calculate, for each of a plurality of living creatures not to be authenticated, a similarity between a third face and a fourth face of each of the living creatures not to be authenticated, based on third image data generated at a third timing and indicating the third face of each of the living creatures not to be authenticated and fourth image data generated at a fourth timing later than the third timing and indicating the fourth face of each of the living creatures not to be authenticated, classify the calculated similarities between the third face and the fourth face into a plurality of groups based on an age of each of the living creatures not to be authenticated in the third image data and a time period from the third timing to the fourth timing, and calculate, for each of the groups, a correction amount based on the similarities classified into a respective one of groups to generate the correction information.

As a result, accurate correction information can be generated.

(5) In the authentication device according to (1), the acquisition unit may be a communication unit that receives the first image data and the age information, and the second image data and the aging information, from an external device through communication.

As a result, face authentication can be performed in the server.

(6) In the authentication device according to (1), the acquisition unit may include a reader that reads the first image data and the age information from a recording medium that stores the first image data and the age information, and an image capturer that generates the second image data and the aging information.

As a result, face authentication can be performed in the collation terminal.

(7) In the authentication device according to (1), the acquisition unit may acquire the first image data and the age information from an integrated circuit (IC) card.

As a result, identification inspection can be accelerated.

(8) In the authentication device according to (1), the living creature may be a human being.

(9) In the authentication device according to (7), the age information may include information that indicates when the living creature has been born, and information that indicates when the integrated circuit (IC) card has been issued or information that indicates when the first image data has been captured, and the aging information may include information that indicates when the second image data has been captured. Alternatively, the age information may be an age calculated from a date of birth and an issuance date or an imaging date. Alternatively, the aging information may be an age when the second image data has been generated. That is, the information that indicates when the living creature has been born does not have to be the date of birth of the living creature, and may be information that indicates the year of the living creature's birth. Similarly, the information that indicates when the integrated circuit (IC) card has been issued, the information that indicates when the first image data has been captured, the information that indicates when the second image data has been captured may be information that indicates the year when the integrated circuit (IC) card has been issued, information that indicates the year when the first image data has been captured, and information that indicates the year when the second image data has been captured, respectively.

(10) In the authentication device according to (2), as the time period increases, the correction amount may increase. Normally, as the time period increases, the similarity decreases. Therefore, through an increase of the correction amount, erroneous determinations when the time period is large can be reduced.

(11) In the authentication device according to (2), as an age of the living creature in the first image data decreases, the correction amount may increase. Normally, as the age decreases, the similarity decreases. Therefore, through an increase of the correction amount, erroneous determinations when the age is low can be reduced.

(12) The authentication system of the present disclosure includes a collation terminal and a server. The collation terminal includes an acquisition unit that acquires first image data generated at a first timing and indicating a first face of a living creature and age information indicating an age of the living creature at the first timing from a recording medium that stores the first image data and the age information, an image capturer that generates, at a second timing later than the first timing, second image data indicating a second face of the living creature and aging information indicating a time period from the first timing to the second timing, and a communication unit that sends the first image data and the age information, and the second image data and the aging information. The server includes a communication unit that receives the first image data and the age information, and the second image data and the aging information, and a controller that calculates a similarity between the first face and the second face based on the first image data and the second image data, corrects the similarity based on the age information and the aging information, and determines, based on the corrected similarity, whether the living creature in the first image data is identical to the living creature in the second image data.

Through a correction of the similarity based on the age information and the aging information, even in a case where the face of the living creature changes over time, the identification can be accurately performed.

(13) The authentication method of the present disclosure acquires first image data generated at a first timing and indicating a first face of a living creature, and age information indicating an age of the living creature at the first timing, acquires second image data generated at a second timing later than the first timing and indicating a second face of the living creature, and aging information indicating a time period from the first timing to the second timing, calculates a similarity between the first face and the second face based on the first image data and the second image data, corrects the similarity based on the age information and the aging information, and determines, based on the corrected similarity, whether the living creature in the first image data is identical to the living creature in the second image data.

Through a correction of the similarity based on the age information and the aging information, even in a case where the face of the living creature changes over time, the identification can be accurately performed.

The authentication device, the authentication system, and the authentication method according to all of the claims of the present disclosure are implemented by, for example, cooperation between hardware resources, such as a processor or a memory, and a program.

INDUSTRIAL APPLICABILITY

The authentication device of the present disclosure is useful for, for example, an automated gate using face authentication.

REFERENCE MARKS IN THE DRAWINGS

1: collation terminal
2: server
3: gate drive device
11: reader
12: image capturer
13: display
14, 23, 33: controller
15, 22: storage
16, 21, 32: communication unit
17, 24: input unit
18, 25, 35: bus
31: gate
34: driving unit
100: authentication system

The invention claimed is:

1. An authentication device comprising:
an acquisition unit configured to:
acquire, from an integrated circuit card, first image data generated at a first timing and indicating a first face of a living creature to be authenticated and age information indicating an age of the living creature at the first timing, and
acquires second image data generated at a second timing later than the first timing and indicating a second face of the living creature, and aging information indicating a time period from the first timing to the second timing; and a controller configured to compare the first image data with the second image data, wherein:
the age information includes:
first information that indicates when the living creature has been born, and
second information that indicates when the integrated circuit card has been issued, the controller is configured to:
calculate a similarity between the first face and the second face based on the first image data and the second image data,
correct the similarity based on the first information, the second information and the aging information, and
determine, based on the corrected similarity, whether the living creature in the first image data is identical to the living creature in the second image data, and
the controller is configured to correct the similarity by using a correction table which comprises correlation amounts for different age groups and different aging time periods.

2. The authentication device according to claim 1, wherein the controller is configured to determine a correction amount that is used when correcting the similarity, based on the age information and the aging information.

3. The authentication device according to claim 2, wherein the correction amount is selected from correction information including a plurality of correction amounts, based on the age information and the aging information.

4. The authentication device according to claim 3, wherein the controller is further configured to:
calculate, for each of a plurality of living creatures not to be authenticated, a similarity between a third face and a fourth face of each of the living creatures not to be authenticated, based on third image data generated at a third timing and indicating the third face of each of the living creatures not to be authenticated and fourth image data generated at a fourth timing later than the third timing and indicating the fourth face of each of the living creatures not to be authenticated,
classify the calculated similarities between the third face and the fourth face into a plurality of groups based on an age of each of the living creatures not to be authenticated in the third image data and a time period from the third timing to the fourth timing, and
calculate, for each of the groups, a correction amount based on the similarities classified into a respective one of groups to generate the correction information.

5. The authentication device according to claim 1, wherein
the acquisition unit is a communication unit that receives the first image data and the age information, and the second image data and the aging information, from an external device through communication.

6. The authentication device according to claim 1, wherein
the acquisition unit includes:
a reader configured to read, from the integrated circuit card, the first image data and the age information, and
an image capturer configured to generate the second image data and the aging information.

7. The authentication device according to claim 1, wherein
the living creature is a human being.

8. The authentication device according to claim 1, wherein the aging information includes information that indicates when the second image data has been captured.

9. The authentication device according to claim 2, wherein
as the time period increases, the correction amount increases.

10. The authentication device according to claim 2, wherein
as an age of the living creature in the first image data decreases, the correction amount increases.

11. An authentication system comprising:
a collation terminal; and
a server, wherein:
the collation terminal includes:
an acquisition unit configured to acquire, from an integrated circuit card, first image data generated at a first timing and indicating a first face of a living creature and age information indicating an age of the living creature at the first timing,
an image capturer that generates, at a second timing later than the first timing, second image data indicating a second face of the living creature and aging information indicating a time period from the first timing to the second timing, and
a communication unit that sends the first image data and the age information, and the second image data and the aging information, and
the server includes:
a communication unit that receives the first image data and the age information, and the second image data and the aging information, and
a controller that calculates a similarity between the first face and the second face based on the first image data and the second image data, corrects the similarity, and determines, based on the corrected similarity, whether the living creature in the first image data is identical to the living creature in the second image data,
the age information includes:
first information that indicates when the living creature has been born, and
second information that indicates when the integrated circuit card has been issued, and
the controller corrects the similarity based on the first information, the second information and the aging information, and
the controller is configured to correct the similarity by using a correction table which comprises correlation amounts for different age groups and different aging time periods.

12. An authentication method comprising:
acquiring, from an integrated circuit card, first image data generated at a first timing and indicating a first face of a living creature, and age information indicating an age of the living creature at the first timing;
acquiring second image data generated at a second timing later than the first timing and indicating a second face of the living creature, and aging information indicating a time period from the first timing to the second timing;
calculating a similarity between the first face and the second face based on the first image data and the second image data;
correcting the similarity; and
determining, based on the corrected similarity, whether the living creature in the first image data is identical to the living creature in the second image data, wherein:
the age information includes:
first information that indicates when the living creature has been born, and
second information that indicates when the integrated circuit card has been issued, and
the similarity is corrected based on the first information, the second information and the aging information, and
the similarity is corrected by using a correction table which comprises correlation amounts for different age groups and different aging time periods.

13. A non-transitory recording medium storing a program that causes a computer to execute:
acquiring, from an integrated circuit card, first image data generated at a first timing and indicating a first face of a living creature, and age information indicating an age of the living creature at the first timing;
acquiring second image data generated at a second timing later than the first timing and indicating a second face of the living creature, and aging information indicating a time period from the first timing to the second timing;
calculating a similarity between the first face and the second face based on the first image data and the second image data;
correcting the similarity; and
determining, based on the corrected similarity, whether the living creature in the first image data is identical to the living creature in the second image data, wherein:
the age information includes:
first information that indicates when the living creature has been born, and
second information that indicates when the integrated circuit card has been issued, and
the similarity is corrected based on the first information, the second information and the aging information, and
the similarity is corrected by using a correction table which comprises correlation amounts for different age groups and different aging time periods.

14. The authentication device according to claim 1, wherein the integrated circuit card is disposed in a passport.

15. The authentication device according to claim 2, wherein:
as the time period increases, the correction amount increases, and
as an age of the living creature in the first image data decreases, the correction amount increases.

* * * * *